United States Patent
Shimoi

(10) Patent No.: US 9,330,008 B2
(45) Date of Patent: May 3, 2016

(54) INFORMATION PROCESSING DEVICE FOR DETECTING SEQUENTIAL ACCESSES AND PREFETCHING

(71) Applicant: FUJITSU LIMITED, Kawasaki-shi, Kanagawa (JP)

(72) Inventor: Hiroyuki Shimoi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 239 days.

(21) Appl. No.: 13/964,787

(22) Filed: Aug. 12, 2013

(65) Prior Publication Data

US 2014/0052928 A1   Feb. 20, 2014

(30) Foreign Application Priority Data

Aug. 17, 2012   (JP) .................. 2012-180878

(51) Int. Cl.
*G06F 12/08*   (2006.01)
*G06F 3/06*   (2006.01)

(52) U.S. Cl.
CPC .... *G06F 12/0862* (2013.01); *G06F 2212/6026* (2013.01)

(58) Field of Classification Search
None
See application file for complete search history.

(56) References Cited

U.S. PATENT DOCUMENTS 5,381,539 A * 1/1995 Yanai et al. .................. 711/133
8,429,351 B1 * 4/2013 Yu et al. ....................... 711/132
2007/0220208 A1   9/2007 Nomura et al.

FOREIGN PATENT DOCUMENTS

JP   6-332629   12/1994
JP   2007-249457   9/2007

* cited by examiner

*Primary Examiner* — Kevin Verbrugge
(74) *Attorney, Agent, or Firm* — Fujitsu Patent Center

(57) ABSTRACT

An information processing device detects a sequential access for reading first data by sequentially accessing consecutive areas or inconsecutive areas within a specified range of a first storage unit when the sequential access consecutively occurs by a specified number, calculates, based on a size of the first data, a size of second data read by a prefetch for prereading the data stored consecutively in the first storage unit and for storing the read data in a second storage unit, and performs the prefetch based on the calculated size of the second data.

9 Claims, 8 Drawing Sheets

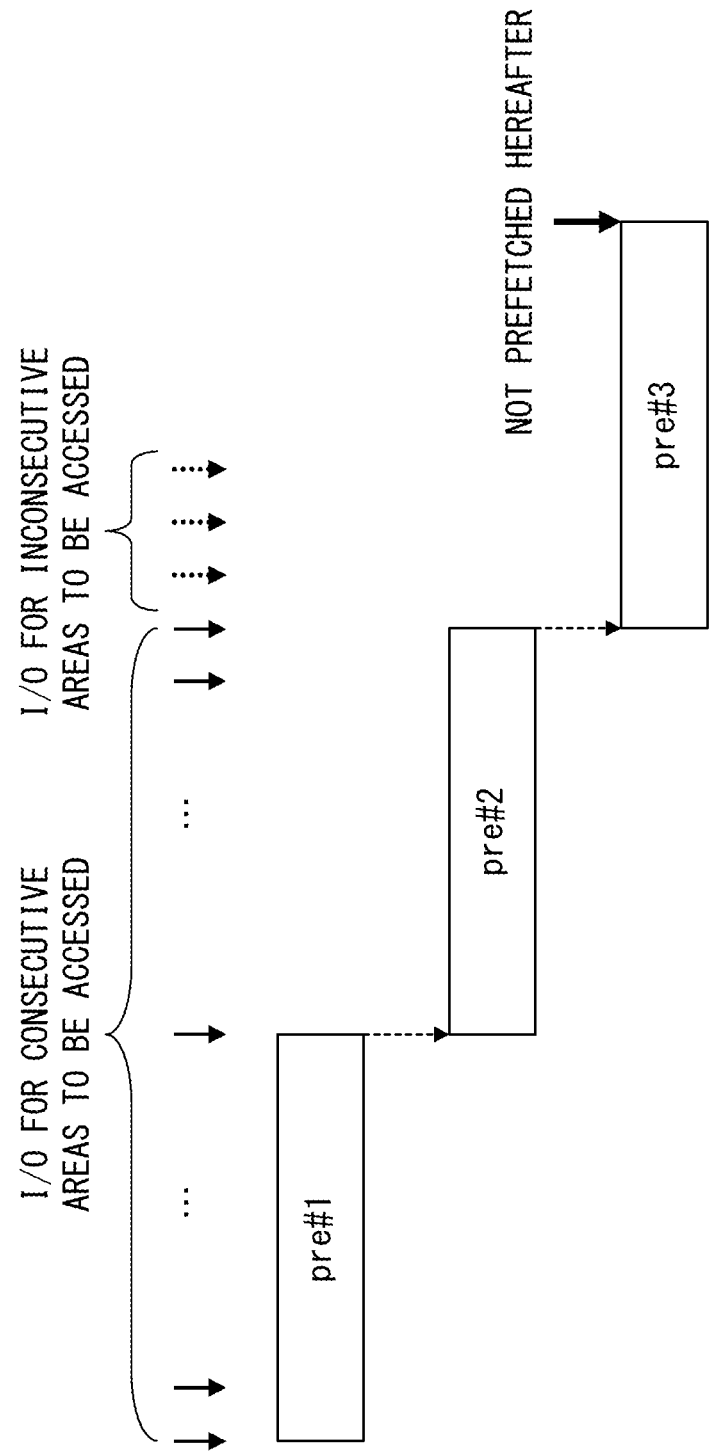
F I G. 2

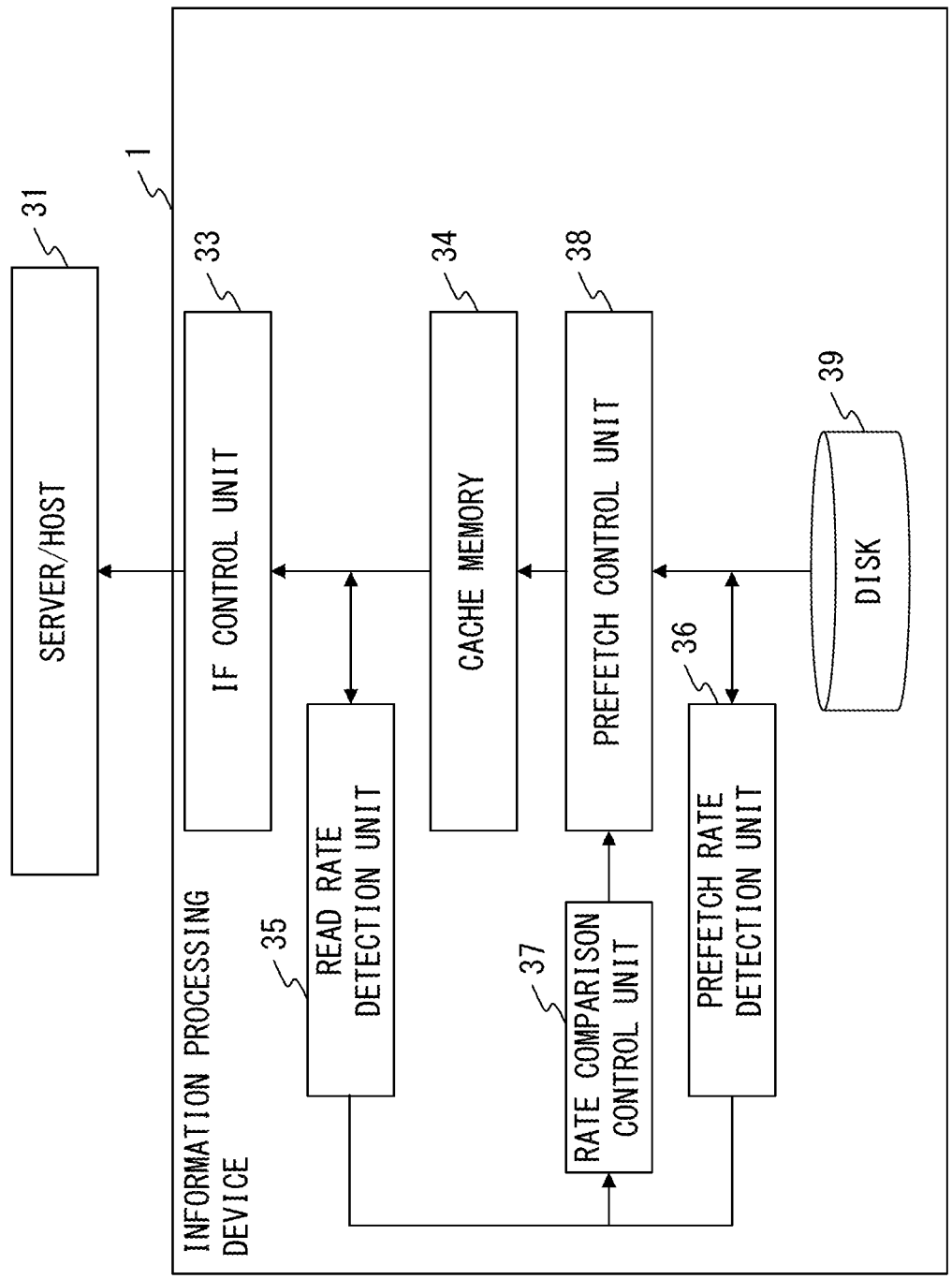
F I G. 5

50

| IDENTIFICATION NUMBER | NUMBER OF PREFETCH HITS |
|---|---|
| 1 | 6 |
| 2 | 6 |
| 3 | 5 |
| 4 | 5 |
| 5 | 3 |
| 6 | 3 |
| 7 | 3 |
|  |  |
|  |  |
|  |  |

F I G. 6

INFORMATION PROCESSING DEVICE FOR DETECTING SEQUENTIAL ACCESSES AND PREFETCHING

CROSS-REFERENCE TO RELATED APPLICATIONS

This application is based upon and claims the benefit of priority of the prior Japanese Patent Application No. 2012-180878, filed on Aug. 17, 2012, the entire contents of which are incorporated herein by reference.

FIELD

The embodiment discussed herein is related to a cache control.

BACKGROUND

A storage device including a plurality of logical volumes for storing data, and a storage controller for controlling an access from a host to the logical volume is known. If access areas (addresses) in a read request to the logical volume are consecutive, the storage controller pre-reads data of the consecutive areas in a cache area without making an input/output to/from the logical volume after a succeeding access occurs. Such a preread operation of consecutive areas is called a prefetch.

By performing a prefetch, a latency and a physical seek time of a magnetic disk can be sometimes shortened for a sequential access. Therefore, a response to a read request issued from the host that accesses the storage device can be improved. Accordingly, sequential performance can be enhanced.

To perform a prefetch, the storage controller monitors consecutiveness of access areas in a read request. The storage controller determines that a prefetch is effective if a specified number (fixed value n) of access areas in the read request are consecutive, and prereads (a fixed number of) address areas predicted to be read by a succeeding read request.

Here, if accesses to the storage device are not sequential but random, LBAs (Logical Block Addresses) to be accessed by a succeeding access cannot be predicted. Therefore, a prefetch operation is not performed.

In regard to monitoring the consecutiveness of addresses, the storage controller can simultaneously monitor, for example, a maximum of 8 consecutive addresses for one LUN (Logical Unit Number). Moreover, n (fixed value), which is a point of determining whether or not to perform a prefetch, can be set, for example, via an MMI (Man Machine Interface).

One example of the prefetch operation performed by the storage controller is described with reference to FIGS. 1 and 2. FIG. 1 is an explanatory diagram of detection of access sequentiality and a prefetch start. FIG. 2 is an explanatory diagram of a continuance and a stoppage of a prefetch.

In the example of FIG. 1, the amount of data prefetched at one time is up to a size of an I/O (Input/Output) from a host×8 (for example, 2 MB at a maximum). A condition for starting a prefetch (hereinafter referred to as a sequentiality detection condition) may be set, for example, to a case where 3 (n=3) addresses (LBAs) specified in consecutive I/O accesses made from the host are consecutive.

In the case of the sequentiality detection condition in this example, if 3 LBAs to be accessed are consecutive in consecutive I/O accesses from the host, the storage controller determines that the consecutive accesses have sequentiality, and starts a prefetch operation for fourth and subsequent accesses.

Additionally, if LBAs accessed from the host are consecutive even though a maximum amount of a prefetch is exceeded, a prefetch operation is continuously performed. As illustrated in the example of FIG. 2, when accesses to consecutive LBAs further occur after pre#1 is prefetched, a prefetch operation is continuously performed for pre#2 and pre#3. Thereafter, this prefetch operation is stopped at a time point when LBAs accessed from the host are not consecutive any more.

The number of consecutive addresses of blocks accessed from the host is sometimes referred to as the number of sequentially consecutive blocks.

Techniques described in the following documents are known.

Document 1: Japanese Laid-open Patent Publication No. 2007-249457
Patent Document 2: Japanese Laid-open Patent Publication No. 06-332629

However, if data preread into a cache by a prefetch is not accessed from the host, this means that an unneeded access to a logical volume is made. Such an unneeded access to a logical volume raises a busy rate of a disk, leading to degradation of performance of a read from the disk.

SUMMARY

According to an aspect of the embodiment, an information processing device includes a first storage unit, a second storage unit, and a processor. The first storage unit stores data. The second storage unit stores the data read from the first storage unit. The processor executes a procedure that includes detecting a sequential access for reading first data of a specified size by sequentially accessing consecutive areas or inconsecutive areas within a specified range of the first storage unit when the sequential access consecutively occurs by a specified number, calculating, based on a size of the first data, a size of second data read by a prefetch for prereading data stored consecutively in the first storage unit and for storing the read data in the second storage unit, and performing the prefetch based on the calculated size of the second data.

The object and advantages of the invention will be realized and attained by means of the elements and combinations particularly pointed out in the claims.

It is to be understood that both the forgoing general description and the following detailed description are exemplary and explanatory and are not restrictive of the invention.

BRIEF DESCRIPTION OF DRAWINGS

FIG. 2 is an explanatory diagram of a continuance and a stoppage of a prefetch.

FIG. 5 illustrates one example of a configuration of the information processing device according to the embodiment.

FIG. 6 illustrates one example of a data structure of a statistical table used to optimize the number of prefetch blocks.

DESCRIPTION OF EMBODIMENTS

A preferred embodiment of the present invention will be explained with reference to accompanying drawings.

In an I/O having short consecutiveness of sequential addresses in an access from a host, a prefetch operation rather degrades performance in some cases. For instance, in the example of FIG. 1, a prefetch for an 8-multiple of an I/O size is performed at a time point when a third consecutive access is made to addresses to be accessed. Therefore, 3+8=11 accesses are made to a disk. At this time, for example, in accesses having consecutiveness of 4 sequential blocks, data of a 4-multiple of the I/O size is actually accessed from the host. Namely, the remaining 7 accesses among the 11 accesses are wasteful. Moreover, if accesses in which the number of sequentially consecutive blocks is 4 occur repeatedly, wasteful 7 accesses continue to occur. As a result, a busy rate of a disk is needlessly raised.

Accordingly, this embodiment reduces wasteful reads caused by a prefetch operation, and improves sequential access performance.

Additionally, prefetched data is sometimes purged from a cache before being used if a cache area becomes full of prefetched data. Such a case occurs when a prefetch is excessively performed for a cache space. In this case, prefetched data is purged without being used by a host, and again prefetched after an I/O request is issued from the host. This raises a busy rate of a disk, leading to a wasteful use of an internal band. As a result, device performance is degraded.

Accordingly, the amount of a prefetch is optimized consciously of a cache free space in this embodiment.

To reduce wasteful reads caused by a prefetch operation, an information processing device according to this embodiment monitors a characteristic of a host I/O to/from a logical volume, and dynamically performs auto tuning for parameters associated with a prefetch control based on monitoring results. Specifically, the information processing device analyzes I/Os from the host, and recognizes a similar sequential access pattern that repeatedly appears. Then, the information processing device sets the quantity of I/Os of the recognized access pattern as the amount of data to be prefetched. Alternatively, the information processing device monitors a hit rate of I/Os for prefetched data, and increases/decreases the amount of a prefetch, or starts or stops a prefetch according to the hit rate if a sequential access having the same hit rate is consecutive.

Figure 1:
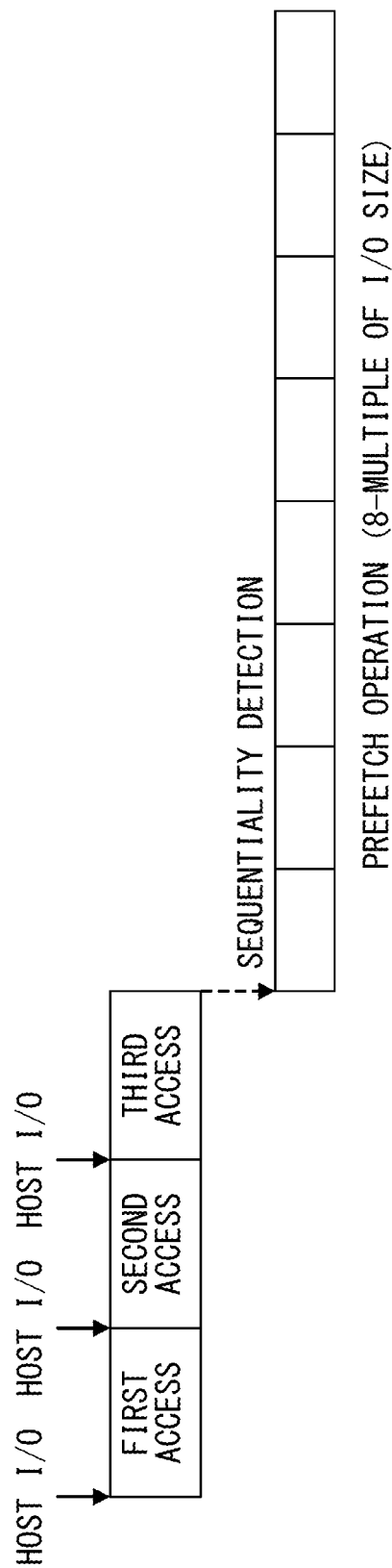
FIG. 1 is an explanatory diagram of detection of access sequentiality and a prefetch start.

In the example of FIG. 1, a sequentiality detection condition is fixed to 3 (set value) accesses, and the number of blocks preread by a prefetch is fixed to 8 (set value). If these fixed parameters are unsuitable for an actual host I/O characteristic, unneeded preread and discarding are repeated, whereby I/O performance is hindered from being improved. Accordingly, in this embodiment, I/O performance is improved by adjusting the number of blocks preread by a prefetch according to an actual host I/O characteristic.

Figure 3:
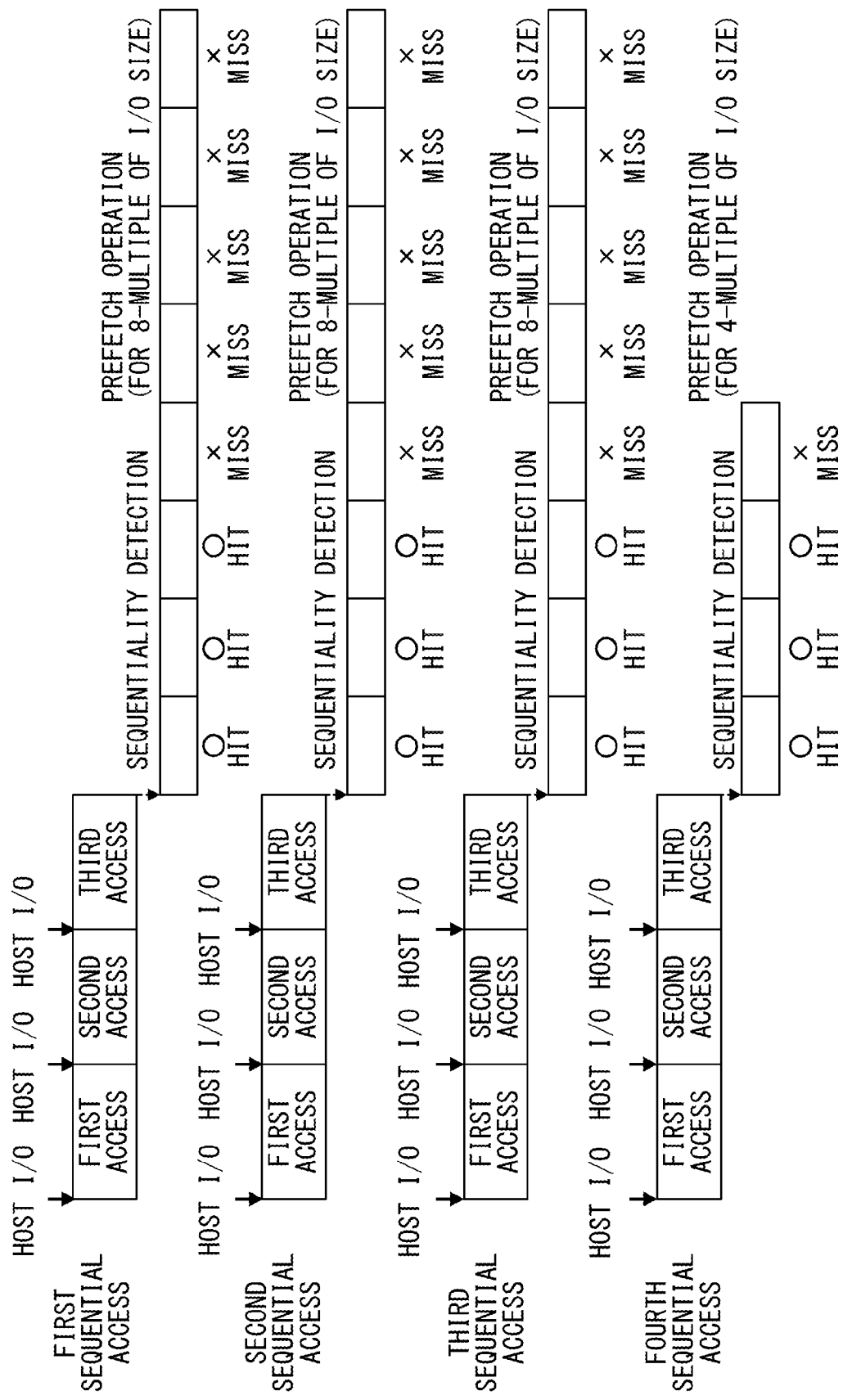
FIG. 3 is an explanatory diagram of an operation for adjusting the amount of a prefetch when a sequential access pattern is consecutive.

FIG. 3 is an explanatory diagram of an operation for adjusting the amount of a prefetch when a sequential access pattern is consecutive. In the example of FIG. 3, if 3 addresses of a block in read requests issued from the host are consecutive, a storage controller determines that these are a sequential access, and performs a prefetch. The example of FIG. 3 assumes that an initial value of the amount of a prefetch is data of 8 blocks.

If 3 addresses of a block in read requests issued from the host are consecutive at the first sequential access, the storage controller determines that a sequential access has occurred, and prefetches data of 8 blocks, which is the initial value of the amount of a prefetch. In the case of this example, the first sequential access occurs for data of 6 blocks. Therefore, data of 3 blocks among the prefetched data is actually used by the host (prefetch hit). However, the data of the remaining 5 blocks among the prefetched data is not used by the host and finally purged (prefetch miss).

Also the second and third sequential accesses have an access pattern similar to that of the first sequential access. Namely, a sequential access for data of 6 blocks occurs. Accordingly, data of 3 blocks among the prefetched data of the 8 blocks results in a prefetch hit, and that of the remaining 5 blocks results in a prefetch miss.

Here, in the prefetch performed in the first to the third sequential accesses, prefetched data of 5 blocks is not used by the host. Therefore, it can be said that the prefetch operations for the data of the 5 blocks are wasteful. In contrast, in the first to the third sequential accesses, a sequential access pattern where addresses of 6 blocks are consecutive is repeated. Hereafter, there is a possibility that a sequential access of a similar pattern is consecutive. In this case, prefetch operations for data of 5 blocks become wasteful per each prefetch.

Accordingly, in this embodiment, an optimum amount of a prefetch is determined based on an immediately preceding sequential access pattern, and the amount of a prefetch is changed based on the determined value. In the example of FIG. 3, the amount of a prefetch is changed to a value obtained by adding 1 to 3, which is the number of prefetch hits in the immediately preceding sequential access pattern, as a subsequent amount of a prefetch.

Accordingly, in the fourth sequential access, data of 4 blocks, which is the changed amount of a prefetch, is prefetched. In this way, a wasteful amount of a prefetch is only that for data of 1 block if a sequential access from the host has a pattern of 6 blocks. Accordingly, a wasteful prefetch is prevented, thereby enabling an efficient prefetch to be performed.

To optimize the amount of a prefetch consciously of a cache free space, the information processing device performs a control such that a prefetch rate becomes equal to a read rate from the host. In this way, the amount of a prefetch is optimized.

If the prefetch rate is faster than the read rate from the host, a cache area is gradually filled with prefetched data, and a cache area cannot be used effectively. In contrast, if the prefetch rate is slower than the read rate from the host, a prefetch becomes too late to produce an effect. Making the prefetch rate equal to the read rate from the host is most appropriate to prevent a cache space from being used excessively.

Figure 4:
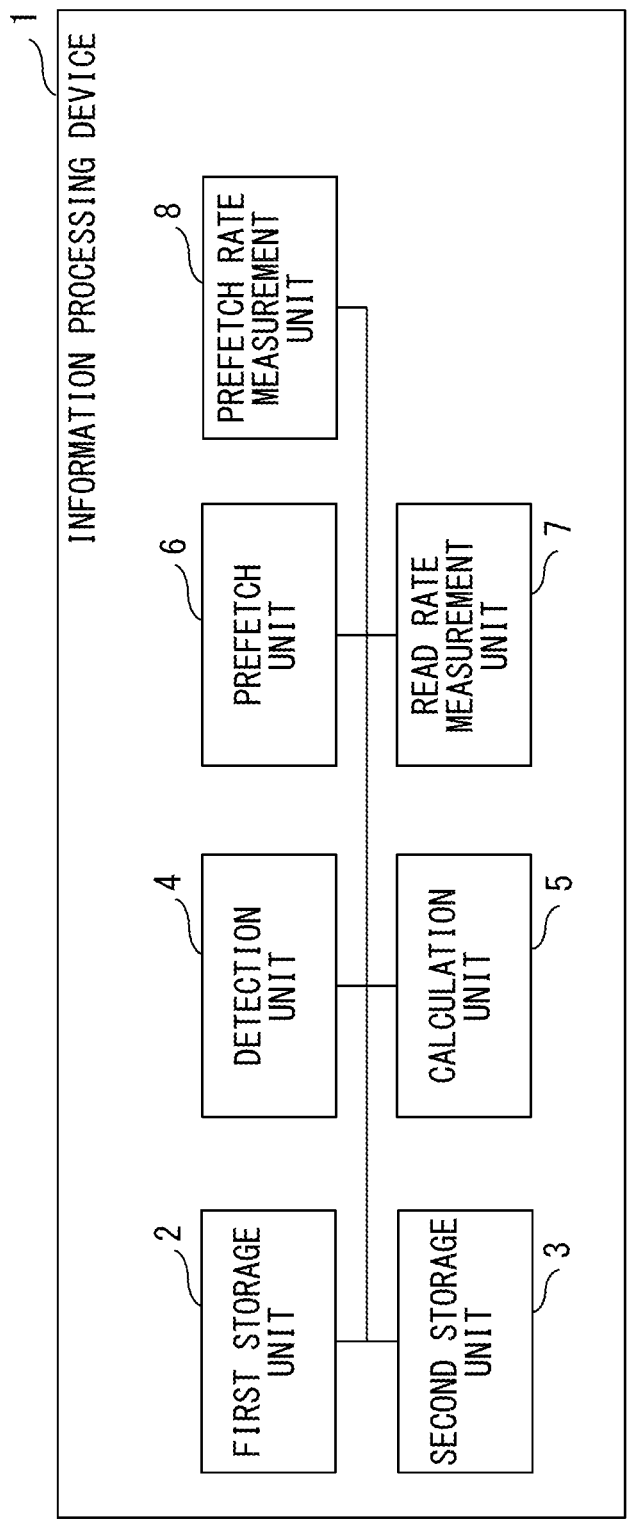
FIG. 4 is a block diagram illustrating one example of functions of an information processing device according to an embodiment.

FIG. 4 is a block diagram illustrating one example of functions of the information processing device according to this embodiment. The information processing device 1 includes a first storage unit 2, a second storage unit 3, a detection unit 4, a calculation unit 5, a prefetch unit 6, a read rate measurement unit 7, and a prefetch rate measurement unit 8.

The first storage unit 2 stores data. The second storage unit 3 stores the data read from the first storage unit 2.

The detection unit 4 detects a sequential access when a sequential access for reading first data of a specified size by sequentially accessing consecutive areas or inconsecutive areas within a specified range in the first storage unit 2 consecutively occurs by a specified number.

Moreover, the detection unit 4 determines, for each sequential access, whether or not a sequential access made at a ratio of the size of the first data to that of the second data, which is equal to or lower than a threshold value, is consecutive by a specified number.

The calculation unit 5 calculates, based on the size of the first data, the size of the second data read by a prefetch for prereading data stored consecutively in the first storage unit 2 and for storing the preread data in the second storage unit 3. Moreover, the calculation unit 5 calculates the size of the second data based on the ratio of the size of the first data to that of the second data if a sequential access made at the ratio of the size of the first data to that of the second data, which is equal to or lower than the threshold value, is consecutive by a specified number. Additionally, the calculation unit 5 calculates a value by adding a specified data size to the size of the first data as the size of the second data. Furthermore, the calculation unit 5 makes a comparison between the read rate measured by the read rate measurement unit 7 and the prefetch rate measured by the prefetch rate measurement unit 8, and calculates the size of the second data according to a result of the comparison.

The prefetch unit 6 performs a prefetch based on the size of the second data, which is calculated by the calculation unit 5. The read rate measurement unit 7 measures the read rate at which data is read from the second storage unit 3 by a sequential access. The prefetch rate measurement unit 8 measures the prefetch rate at which data is read by the prefetch unit 6.

FIG. 5 illustrates one example of a configuration of the information processing device according to this embodiment.

The information processing device 1 is connected to a server/host 31, and includes an IF control unit 33, a read rate detection unit 35, a prefetch rate detection unit 36, a rate comparison control unit 37, a prefetch control unit 38, a cache memory 34, and a disk 39.

The IF control unit 33 is cited as one example of the detection unit 4 and the calculation unit 5. The read rate detection unit 35 is cited as one example of the read rate measurement unit 7. The prefetch rate detection unit 36 is cited as one example of the prefetch rate measurement unit 8. The rate comparison control unit 37 is cited as one example of the calculation unit 5. The prefetch control unit 38 is cited as one example of the prefetch unit 6. The cache memory 34 is cited as one example of the second storage unit 3. The disk 39 is cited as one example of the first storage unit 2.

The server/host 31 makes a data input/output (I/O) to/from the information processing device 1, and performs a data write, a data read, and the like.

The IF control unit 33 controls an I/O that the server/host 31 makes to/from the information processing device 1. Upon receipt of a read request from the server/host 31, the IF control unit 33 determines whether or not data to be accessed is present in the cache memory 34. If the data to be accessed is present in the cache memory 34, the IF control unit 33 transmits the data within the cache memory 34 to the server/host 31. If the data to be accessed is not present in the cache memory 34, the IF control unit 33 makes an access to an area to be accessed of the disk 39, and reads the data to be accessed into the cache memory 34. Then, the IF control unit 33 transmits the data read into the cache memory 34 to the server/host 31.

Upon receipt of a write request from the server/host 31, the IF control unit 33 writes write data to the cache memory 34, and transmits a completion notification of the write to the server/host 31. Thereafter, the IF control unit 33 writes the write data stored in the cache memory 34 to the disk 39 at appropriate timing. Alternatively, the IF control unit 33 may also transmit a write completion notification to the server/host 31 upon completion of the write of the write data to the disk 39.

Additionally, the IF control unit 33 has a prefetch start determination function. This is a function of determining whether or not an access from the server/host 31 is a sequential access, and of instructing the prefetch control unit 38 to perform a prefetch if the function determines that the access from the server/host 31 is a sequential access.

The determination of whether or not the access from the server/host 31 is a sequential access is performed in a way such that the IF control unit 33 monitors consecutiveness of addresses to be accessed in a read request from the server/host 31. Specifically, the IF control unit 33 determines that the access from the server/host 31 is a sequential access if the addresses of blocks in the read request from the server/host 31 are consecutive by a set value (N). Here, the set value (N) used to determine whether or not an access from the server/host 31 is a sequential access is sometimes referred to as the number of sequentiality detection blocks in the following description.

If the IF control unit 33 determines that the access from the server/host 31 is a sequential access, the unit issues, to the prefetch control unit 38, an instruction for performing a prefetch of prereading blocks by a set value (M) starting at an LBA succeeding an Nth consecutive block. The set value (M) of the number of blocks to be preread by a prefetch is sometimes referred to as the number of prefetch blocks in the following description.

Here, assume that a case where addresses of blocks in a read request from the server/host 31 are consecutive includes not only a case where the addresses of the blocks are perfectly consecutive but a case where the addresses are nearly consecutive. The case where the accesses are nearly consecutive indicates a case where a difference between an address of an accessed block and that of a block accessed immediately preceding the above described block is within a specified threshold value. The specified threshold value is a value settable by a user. Specifically, the specified threshold value maybe set to, for example, 64 KB (kilobytes), 512 KB, or the like. Moreover, this threshold value may be set to a value corresponding to a block size (I/O size).

The IF control unit 33 further has a pattern detection function and a prefetch amount control function. In a read request from the server/host 31, sequential accesses that make access to blocks, the number of which is the same for each of the acessess are sometimes consecutive by a specified number or more. In this embodiment, such sequential accesses, which is consecutive by the specified number, is referred to as an access pattern. The pattern detection function and the prefetch amount control function are functions of detecting such an access pattern and optimizing the amount of a prefetch by using the number of read blocks of the detected access pattern.

The pattern detection function is a function of detecting an access pattern. Specifically, the pattern detection function performs the following operations. When a sequential access occurs in a read request from the server/host 31, the pattern detection function saves the total number of blocks read by the sequential access as statistical data. Then, if a sequential access that makes access to the same number of blocks is consecutive by the specified threshold value (p), the pattern detection function detects such a sequential access as an access pattern by using the statistical data.

FIG. 6 illustrates an example of the statistical data saved by the pattern detection function. FIG. 6 illustrates one example of a data structure of a statistical table for storing statistical data used to optimize the number of prefetch blocks. The statistical table 50 includes entries such as "identification number" and "the number of prefetch hits".

"identification number" is assigned uniquely to each sequential access if the IF control unit 33 determines that a sequential access occurs. When a sequential access occurs, a prefetch is performed. In other words, it can be said that "identification number" is a number uniquely assigned to a performed prefetch each time the IF control unit 33 performs a prefetch.

"the number of prefetch hits" is a numerical value indicating the number of prefetch hits corresponding to a prefetch assigned with "identification number". Here, "the number of prefetch hits" is a value obtained by subtracting the number of sequentiality detection blocks (N) from the number of read blocks of an access pattern. Accordingly, the data entry saved as statistical data maybe the number of read blocks of an access pattern as a replacement for "the number of prefetch hits" (if one of the entries is recorded, the other is derived with a calculation).

Here, a threshold value (p) that the pattern detection function uses to detect an access pattern is sometimes referred to as a pattern consecutiveness threshold value in the following description of this embodiment. The pattern consecutiveness threshold value is a value that a user of the information processing device 1 may set and change.

The prefetch amount control function is a function of deciding a change value of the number of prefetch blocks (M) according to the number of read blocks of the access pattern detected by the pattern detection function. Specifically, the prefetch amount control function, for example, decides the change value so that the number of prefetch blocks (M) is changed to the number of prefetch hits+1 (specified value) by obtaining the number of prefetch hits corresponding to the number of read blocks of the access pattern. The prefetch control function transmits the decided change value of the number of prefetch blocks (M) to the prefetch control unit 38.

Here, a ratio of the number of prefetch hits to the number of prefetch blocks (M) is referred to as a prefetch hit ratio. Accesses that achieve an equal prefetch hit ratio and are consecutive by a specified number or more may be used as an access pattern to optimize the number of prefetch blocks. In this case, if accesses that achieve an equal prefetch hit ratio are consecutive by a specified number or more, the pattern detection function detects such accesses as an access pattern. Moreover, the statistical table 50 is configured to include the number of prefetch blocks (M) made to correspond to "identification number" in addition to "identification number" and "the number of prefetch hits".

Additionally, in this case, the prefetch amount control function decides the number of prefetch blocks according to the prefetch hit ratio of the access pattern detected by the pattern detection function. Specifically, for example, the prefetch control function makes an association between a range of the prefetch hit ratio and the number of prefetch blocks, which is to be changed, and decides the number of prefetch blocks as that corresponding to the prefetch hit ratio if the ratio is within the specified range. Alternatively, if the prefetch hit ratio is equal to or lower than the specified threshold value, the prefetch control function may decide the number of prefetch blocks as a value obtained by decreasing the current value of the number of prefetch blocks. In contrast, if the prefetch hit ratio is equal to or higher than the specified threshold value, the prefetch control function may decide the number of prefetch blocks as a value obtained by increasing the current value of the number of prefetch blocks.

The read rate detection unit 35 detects the length of time (hereinafter referred to as a read rate) that the IF control unit 33 needs to actually read data from the cache memory 34. The read rate is, for example, the amount of data that is read by the IF control unit 33 from the cache memory and is output to the server/host 31 per unit time. Alternatively, the read rate is, for example, the length of time that the IF control unit 33 needs to read data of a specified size from the cache memory 34 and output the data to the server/host 31 per unit time. The read rate detection unit 35 outputs the detected read rate to the rate comparison control unit 37.

The prefetch rate detection unit 36 detects the length of time (hereinafter referred to as a prefetch rate) that the prefetch control unit 38 needs to perform a prefetch from the disk 39 to the cache memory 34. The prefetch rate is, for example, the amount of data that the prefetch control unit 38 reads from the disk 39 and stores in the cache memory 34 per unit time. Alternatively, the prefetch rate is, for example, the length of time that the prefetch control unit 38 needs to read data of a specified size from the disk 39 and stores the read data in the cache memory 34 per unit time. Here, for example, the unit time, or the unit time and the specified size, which are used to define the read rate and the prefetch rate, are in common. The prefetch rate detection unit 36 outputs the detected prefetch rate to the rate comparison control unit 37.

The rate comparison control unit 37 receives the read rate and the prefetch rate respectively from the read rate detection unit 35 and the prefetch rate detection unit 36. Then, the rate comparison control unit 37 makes a comparison between the received read rate and prefetch rate. If the read rate is faster than the prefetch rate as a result of the comparison, the rate comparison control unit 37 issues, to the prefetch control unit 38, an instruction for increasing (for example, incrementing) the number of prefetch blocks (M). In contrast, if the prefetch rate is faster than the read rate, the rate comparison control unit 37 issues, to the prefetch control unit 38, an instruction for decreasing (for example, decrementing) the number of prefetch blocks (M).

Upon receipt of the instruction for starting a prefetch from the IF control unit 33, the prefetch control unit 38 starts the prefetch. The prefetch control unit 38 receives a change value of the number of prefetch blocks (M) from the IF control unit 33. The prefetch control unit 38 further receives an instruction for changing the number of prefetch blocks (M) from the rate comparison control unit 37. Then, the prefetch control unit 38 sets the number of prefetch blocks (M) to the received change value, or sets the number of prefetch blocks (M) according to the change instruction. Then, the prefetch control unit 38 reads, from the disk 39, blocks by the number of prefetch blocks (M) at one prefetch, and stores the read blocks in the cache memory 34. If the value of the number of prefetch blocks (M) is 0, a prefetch is not performed.

The cache memory 34 is used to pass data, for example, between the server/host 31 and the disk 39. Both data read by the server/host 31 and that written by the server/host 31 are passed via the cache memory 34.

A unit (I/O size) in which the prefetch control unit 38 reads data from the disk 39 into the cache memory 34 does not need to match a unit in which the server/host 31 reads data from the cache memory 34. The prefetch control unit 38 may read data, for example, in a unit larger than that in which the server/host 31 reads data from the cache memory 34. In this case, the prefetch control unit 38 prefetches an area including data to be accessed from the server/host 31.

Figure 7:
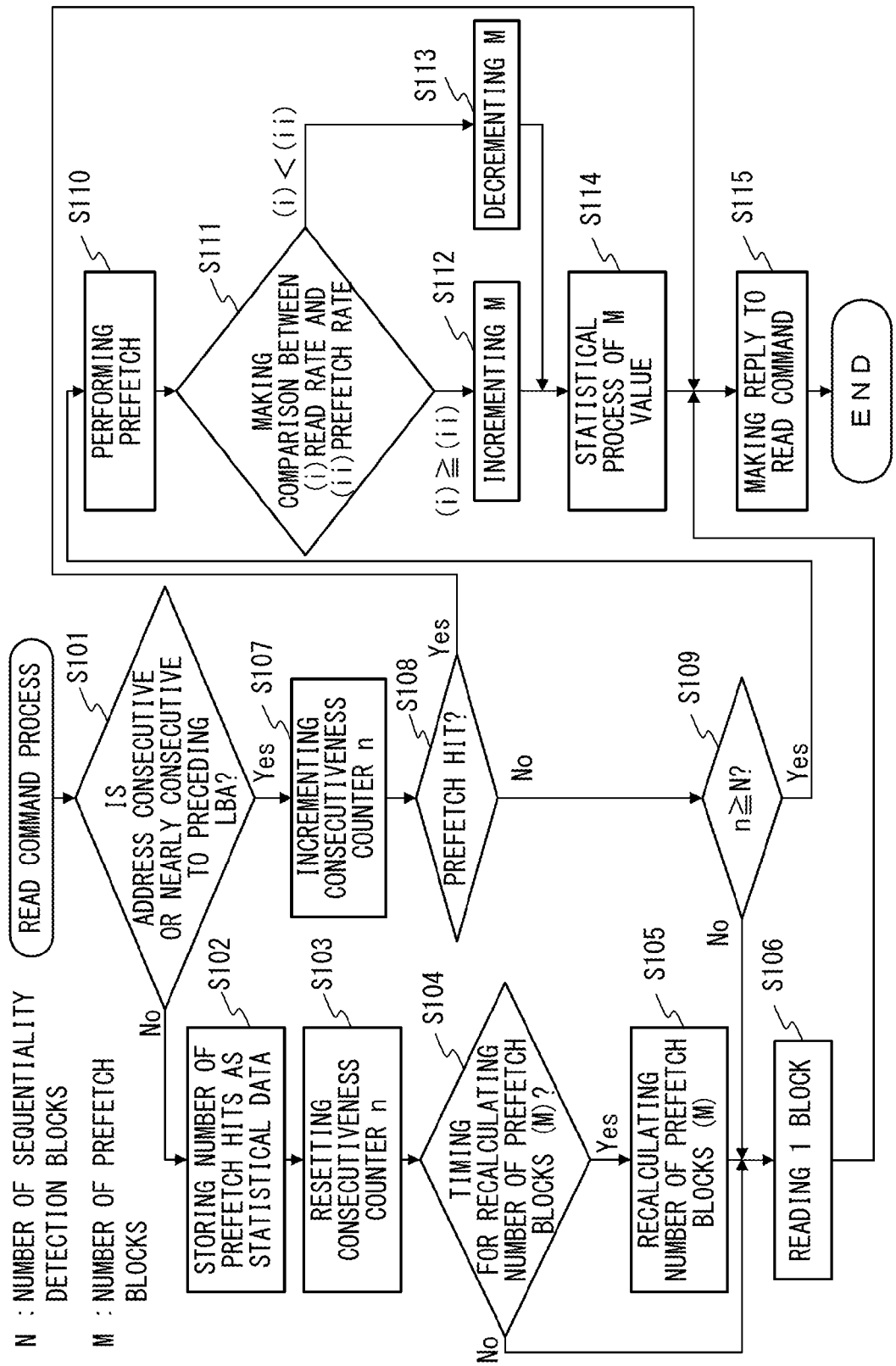
FIG. 7 illustrates a flow of operations of the information processing device when a read request is issued from a server/host.

FIG. 7 illustrates a flow of operations of the information processing device when a read request is issued from the server/host. In this embodiment, the number of sequentiality detection blocks (N), the number of prefetch blocks (M), and the pattern consecutiveness threshold value (p) are respectively set to 3, 8, and 3 as initial values at the start of the flow. However, these parameters are not limited to the above described values. Moreover, in this embodiment, a consecutiveness counter (n) is used as a variable for counting the consecutiveness of sequential blocks. Note that this flow represents a process flow of the information processing device 1 when the information processing device 1 receives a read request for one block from the server/host 31.

Initially, the IF control unit 33 makes a comparison between an address of a block for which a read request is issued in this flow and that of the block in a preceding read request, and determines whether or not this address is consecutive or nearly consecutive to the preceding address (S101). If the address is neither consecutive nor nearly consecutive as a result of the determination ("NO" in S101), the IF control unit 33 stores the number of prefetch hits in the immediately preceding sequential access in the statistical table 50 (S102). Specifically, the IF control unit 33 assigns a unique number as "identification number" in the statistical table 50, and stores the number of prefetch hits in the immediately preceding sequential access as "the number of prefetch hits" in the statistical table 50 in association with the assigned number. The number of prefetch hits in the immediately preceding sequential access may be calculated by subtracting the value of the number of sequentiality detection blocks (N) from the current value of the consecutiveness counter (n). Here, a case where the calculated number of prefetch hits is smaller than 0, such as a case of a random access, or the like, is expected. In this case, the number of prefetch hits is set to 0.

Next, the IF control unit 33 resets the value of the consecutiveness counter (n) (S103). Specifically, the IF control unit 33 sets the value of the consecutiveness counter (n), for example, to 1.

Next, the IF control unit 33 determines whether or not the current timing is timing for recalculating the number of prefetch blocks (M) (S104). The recalculation of the number of prefetch blocks (M) is an operation performed when the above described access pattern occurs. Namely, this step is equivalent to performing the detection operation of an access pattern by the pattern detection function of the IF control unit 33. Specifically, the IF control unit 33, for example, verifies contents of the statistical table 50, and determines whether or not a sequential access that achieves the same number of prefetch hits is consecutive most recently by the pattern consecutiveness threshold value (p). If the sequential access is consecutive by the pattern consecutiveness threshold value (p), the IF control unit 33 determines that the current timing is the timing for recalculating the number of prefetch blocks. With reference to the example of FIG. 6, the most recently sequential access has "identification number" 7, and "the number of prefetch hits" 3. "the number of prefetch hits" 3 is consecutive from "identification number" 5 to "identification number" 7. Accordingly, the sequential access that achieves "the same number of prefetch hits" is consecutive most recently by 3, which is the pattern consecutiveness threshold value (p), or more. Therefore, the IF control unit 33 detects an access pattern, namely, determines that the current timing is the timing for recalculating the number of prefetch blocks.

If the IF control unit 33 determines that the current timing is the timing for recalculating the number of prefetch blocks ("YES" in S104), the IF control unit 33 recalculates the number of prefetch blocks (S105). Specifically, the IF control unit 33 decides, for example, a value obtained by adding 1 to the value of the most recent number of prefetch hits, which is stored in the statistical table 50, as a change value of the number of prefetch blocks. Then, the IF control unit 33 transmits the decided change value of the number of prefetch blocks to the prefetch control unit 38, which then changes the value of the number of prefetch blocks (M) to the received change value. In the case of the example illustrated in FIG. 6, the most recent number of prefetch hits is 3, which is "the number of prefetch hits" corresponding to "identification number" 7 in the statistical table 50. Therefore, 4 obtained by adding 1 to 3 is set as a new number of the number of prefetch blocks (M).

Next, the IF control unit 33 reads a block of a target address in a read request from the disk 39 into the cache memory 34 (S106). Then, the IF control unit 33 makes a reply to a read command by using data of the block read into the cache memory 34 in S106 (S115).

If the IF control unit 33 determines that the current timing is not the timing for recalculating the number of prefetch blocks ("NO" in S104), the IF control unit 33 reads the block of the target address in the read request from the disk 39 into the cache memory 34 (S106). Then, the IF control unit 33 makes a reply to the read command to the server/host 31 by using data of the block read into the cache memory 34 in S106.

If the IF control unit 33 determines that the address of the block for which the read request is issued in the flow is consecutive or nearly consecutive to the preceding address in S101, the unit increments the value of the consecutiveness counter (n) (S107).

Next, the IF control unit 33 determines whether or not an access in the read request from the server/host 31 is a prefetch hit (S108). Specifically, the IF control unit 33, for example, determines whether or not data of a block for which the read request has been issued from the server/host 31 is present in the cache memory 34. If the data of the block for which the read request has been issued is present in the cache memory 34, the IF control unit 33 determines that the access is a prefetch hit. Otherwise, the control unit 33 determines that the access is not a prefetch hit (prefetch miss).

If the IF control unit 33 determines that the access is a prefetch hit ("YES" in S108), the unit 33 makes a reply to the read command to the host/server by using data of the block saved in the cache memory 34 (S115).

If the IF control unit 33 determines that the access is not a prefetch hit (prefetch miss) ("NO" in S108), the unit further determines whether or not the value of the consecutiveness counter (n) is equal to or larger than the number of sequentiality detection blocks (N) (S109). In this step, the IF control unit 33 determines whether or not the read request from the server/host 31 is a sequential access. If the value of the consecutiveness counter (n) is smaller than the number of sequentiality detection blocks (N) ("NO" in S109), the IF control unit 33 reads the block of the target address in the read request from the disk 39 into the cache memory 34 (S106). Then, the IF control unit 33 makes a reply to the read command to the server/host 31 based on the block read into the cache memory 34 in S106 (S115).

If the IF control unit 33 determines that the value of the consecutiveness counter (n) is equal to or larger than the number of sequentiality detection blocks (N) in S109 ("YES" in S109), the unit instructs the prefetch control unit 38 to perform a prefetch. Then, the prefetch control unit 38 prefetches blocks by the current value of the number of prefetch blocks (M) (S110). Namely, the prefetch control unit 38 reads, into the cache memory 34, the block to be accessed, and blocks consecutive to the block to be accessed by the number of prefetch blocks (M). Note that the M consecutive blocks may be read in a background. In this case, the flow proceeds to the next step at a time point when the initial 1 block has been read.

Next, the rate comparison control unit 37 makes a comparison between a read rate and a prefetch rate (S111). Specifically, the rate comparison control unit 37 receives the read rate and the prefetch rate respectively from the read rate detection unit 35 and the prefetch rate detection unit 36, and makes a comparison between the two received values.

If the read rate is equal to or higher than the prefetch rate, the rate comparison control unit 37 increments the value of the number of prefetch blocks (M) (S112). Then, the IF control unit 33 saves the value of the number of prefetch blocks (M) for the statistical process (S114). For example, an average value of the number of prefetch blocks (M) in a specified duration, which is saved here, may be used as the initial value of the number of prefetch blocks (M) in this flow after the information processing device 1 is reactivated. Next, the IF control unit 33 makes a reply to the read command by using data of the block prefetched in S110 (S115). Note that this step is executed after a prefetch is terminated if the prefetch is performed in the background in S110.

If the read rate is slower than the prefetch rate in S111, the rate comparison control unit 37 decrements the value of the number of prefetch blocks (M) (S113). Then, the IF control unit 33 saves the value of the number of prefetch blocks (M) for the statistical process (S114). Next, the IF control unit 33 makes a reply to the read command to the server/host 31 by using the data of the block prefetched in S110 (S115). Note that this step is executed after a prefetch is terminated if the prefetch is performed in the background in S110.

The flow of operations illustrated in FIG. 7 is executed for each LUN of the information processing device 1.

Figure 8:
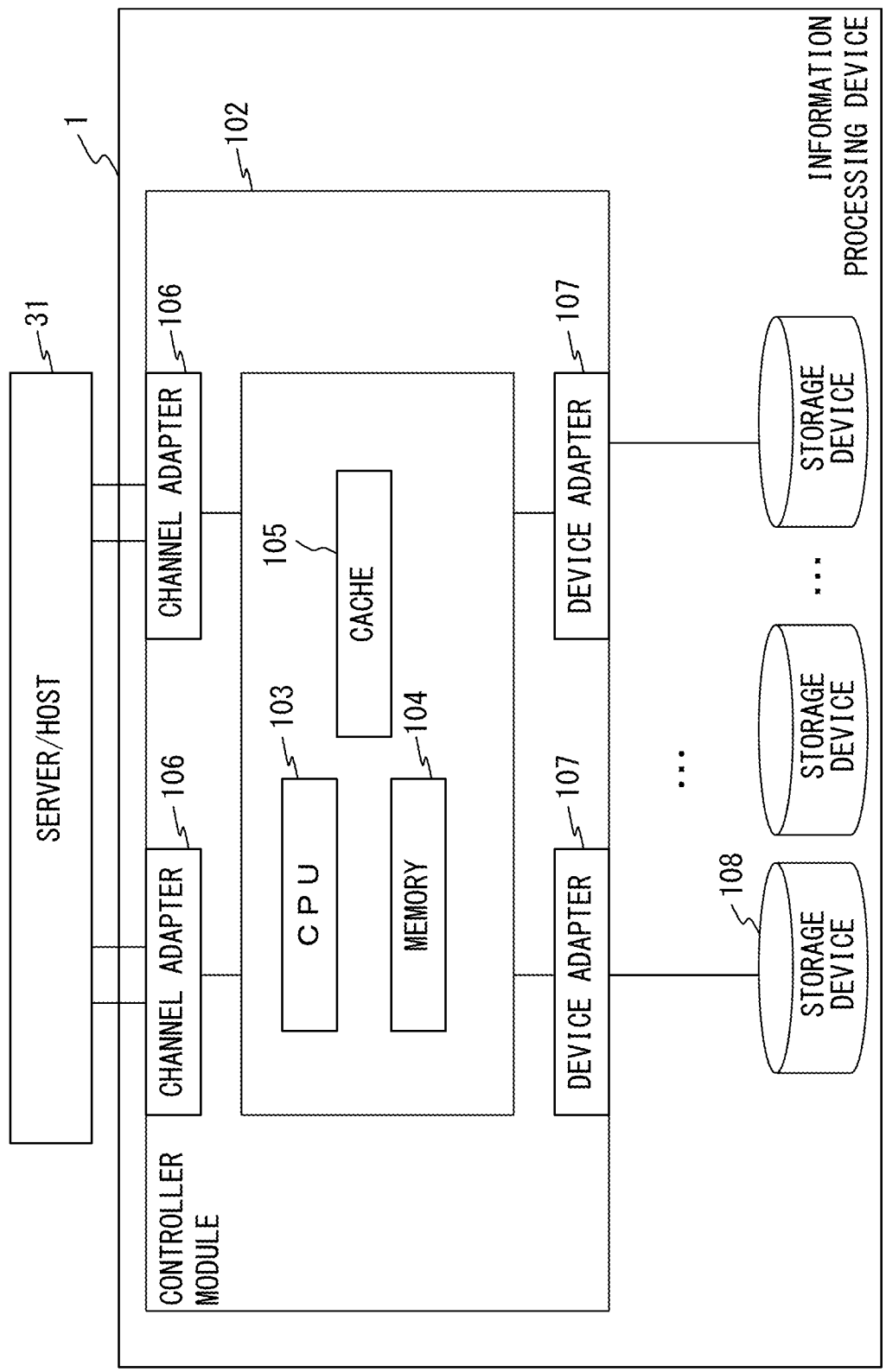
FIG. 8 illustrates one example of a hardware configuration of the information processing device according to the embodiment.

A hardware configuration of the information processing device 1 is described next. FIG. 8 illustrates one example of the hardware configuration of the information processing device according to this embodiment. The information processing device 1 is connected to the server/host 31 as a higher-order device, and includes a plurality of storage devices 108 for storing data transmitted from the server/host 31, and a controller module 102 for controlling these storage devices 108.

The controller module 102 includes a CPU (Central Processing Unit) 103, a memory 104, and a cache 105. Moreover, the controller module 102 is connected to the server/host 31 via channel adapters 106. Additionally, the controller module 102 is connected to the storage devices 108 via device adapters 107. The CPU 103, the memory 104, the cache 105, the channel adapters 106, and the device adapters 107 are interconnected, for example, via a bus. The information processing device 1 may be configured by including a number of HDDs (Hard Disk Drives) that configure a RAID (Redundant Arrays of Inexpensive Disks).

The CPU 103 provides some or all of the functions of the IF control unit 33 and the prefetch control unit 38 by executing a program that describes the procedures of the above described flowcharts by using the memory 104. Moreover, the CPU 103 also provides some or all of the functions of the read rate detection unit 35, the prefetch rate detection unit 36, and the rate comparison control unit 37 by similarly executing a program that describes the procedures of the above described flowcharts by using the memory 104. The memory 104 is, for example, a semiconductor memory, and configured by including a RAM (Random Access Memory) area and a ROM (Read Only Memory) area. The cache 105 provides some or all of the functions of the cache memory 34. The storage device s108 provide some or all of the functions of the disk 39.

Additionally, the controller module 102 may be configured by including a reading device, a communication interface, and an input/output device. The reading device accesses an insertable/removable recording medium according to an instruction of the CPU 103. The insertable/removable recording medium is implemented, for example, with a semiconductor device (USB memory or the like), a medium (such as a magnetic disk or the like) to/from which information is input/output with a magnetic action, a medium (such as a CD-ROM, a DVD, or the like) to/from which information is input/output with an optical action, or the like. The communication interface transmits/receives data via a network according to an instruction of the CPU 103. The input/output device is equivalent, for example, to a device that accepts an instruction from a user.

An information processing program for implementing the embodiment is provided to the information processing device 1, for example, in the following forms.
(1) Preinstalled in the memory 104.
(2) Provided with an insertable/removable recording medium.
(3) Provided from a program server connected to the controller module 102 via a communication interface.

An information processing method for implementing the embodiment may provide the processes of the above described flowcharts by using a plurality of information processing devices 1. In this case, one information processing device 1 may request another information processing device 1 to execute some of the processes of the above described flowcharts via a network, and may receive results of the processes.

Additionally, part of the information processing device 1 according to the embodiment may be implemented with hardware. Alternatively, the information processing device 1 according to the embodiment may be implemented with a combination of software and hardware.

Furthermore, the number of hosts to which the information processing device 1 is connected, that of controller modules 102 included in the information processing device 1, and that of storage devices 108 included in the information processing device 1 are not limited. Also the number of channel adapters 106 included in the controller module 102, and that of device adapters 107 included in the controller module 102 are not limited.

Still further, the information processing device 1 maybe configured to be able to transmit/receive data to/from another information processing device (not illustrated) that is configured similarly or nearly similarly to the information processing device 1.

This embodiment is not limited to the above described one, and a variety of configurations or embodiments can be implemented within a scope that does not depart from the gist of this embodiment.

With the information processing device according to this embodiment, sequential access performance can be improved in a cache control.

All examples and conditional language provided herein are intended for the pedagogical purposes of aiding the reader in understanding the invention and the concepts contributed by the inventor to further the art, and are not to be construed as limitation to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
   a first storage unit that stores data;
   a second storage unit that stores the data read from the first storage unit; and
   a processor that executes a procedure, the procedure including:
   detecting that a predetermined number of sequential accesses each having read data of a same total size have occurred consecutively, each of the sequential access being an access for reading data by sequentially accessing consecutive areas or inconsecutive areas within a specified range of the first storage unit;
   when it is detected that the predetermined number of sequential accesses each having read data of the same total size have occurred consecutively, calculating, based on the same total size, a size of prefetch data read by a prefetch for prereading data stored consecutively in the first storage unit and for storing the read data in the second storage unit;
   performing the prefetch based on the calculated size of the prefetch data,
   measuring a read rate at which data is read from the second storage unit by the sequential access; and
   measuring a prefetch rate at which data is read by the prefetch, wherein
   the calculating makes a comparison between the read rate and the prefetch rate, and calculates the size of the prefetch data according to a result of the comparison.

2. The information processing device according to claim 1, wherein
   the detecting determines, for each sequential access, whether or not a sequential access in which a ratio of the same total size to the size of the prefetch data is equal to or lower than a threshold value, is consecutive by a specified number, and
   the calculating calculates the size of the prefetch data based on the ratio when the sequential access in which the ratio of the same total size to the size of the prefetch data is equal to or lower than the threshold value, is consecutive by the specified number.

3. The information processing device according to claim 1, wherein
   the calculating calculates a value obtained by adding a specified data size to the size of the same total size as the size of the prefetch data.

4. An information processing method executed by a computer, the information processing method comprising:
   detecting, by the computer, that a predetermined number of sequential accesses each having read data of a same total size have occurred consecutively, each of the sequential access being an access for reading data by sequentially accessing consecutive areas or inconsecutive areas within a specified range of a first storage unit that stores data;
   when it is detected that the predetermined number of sequential accesses each having read data of the same total size have occurred consecutively, calculating, by the computer, based on the same total size, a size of prefetch data read by a prefetch for prereading data stored consecutively in the first storage unit and for storing the read data in a second storage unit that stores the data read from the first storage unit;
   performing, by the computer, the prefetch based on the calculated size of the prefetch data,
   measuring, by the computer, a read rate at which data is read from the second storage unit by the sequential access; and
   measuring, by the computer, a prefetch rate at which data is read by the prefetch, wherein
   the calculating makes a comparison between the read rate and the prefetch rate, and calculates the size of the prefetch data according to a result of the comparison.

5. The information processing method according to claim 4, wherein
   the detecting determines for each sequential access, whether or not a sequential access in which a ratio of the size of the same total size to the size of the prefetch data is equal to or lower than a threshold value, is consecutive by a specified number, and
   the calculating calculates the size of the prefetch data based on the ratio when the sequential access in which the ratio of the size of the same total size to the size of the prefetch data is equal to or lower than the threshold value, is consecutive by the specified number.

6. The information processing method according to claim 4, wherein
   the calculating calculates a value obtained by adding a specified data size to the same total size as the size of the prefetch data.

7. A non-transitory computer-readable recording medium having stored therein a program for causing a computer to execute a process comprising:
   detecting that a predetermined number of sequential accesses each having read data of a same total size have occurred consecutively, each of the sequential access being an access for reading data by sequentially accessing consecutive areas or inconsecutive areas within a specified range of a first storage unit that stores data;
   when it is detected that the predetermined number of sequential accesses each having read data of the same total size have occurred consecutively, calculating, based on the same total size, a size of prefetch data read by a prefetch for prereading the data stored consecutively in the first storage unit and for storing the read data in a second storage unit that stores the data read from the first storage unit;
   performing the prefetch based on the calculated size of the prefetch data,
   measuring a read rate at which data is read from the second storage unit by the sequential access; and
   measuring a prefetch rate at which data is read by the prefetch, wherein
   the calculating makes a comparison between the read rate and the prefetch rate, and calculates the size of the prefetch data according to a result of the comparison.

8. The computer-readable recording medium according to claim 7, wherein
   the detecting determines whether or not a sequential access in which a ratio of the size of the same total size to the size of the prefetch data is equal to or lower than a threshold value, is consecutive by a specified number, and
   the calculating calculates the size of the prefetch data based on the ratio when the sequential access in which the ratio of the size of the same total size to the size of the prefetch data is equal to or lower than the threshold value, is consecutive by the specified number.

9. The computer-readable recording medium according to claim 7, wherein the calculating calculates a value obtained by adding a specified data size to the size of the same total size as the size of the prefetch data.

\* \* \* \* \*